June 5, 1962  R. L. NEEDHAM ETAL  3,038,093
DYNAMOELECTRIC MACHINE INSULATION SYSTEM
Filed Feb. 3, 1960  2 Sheets-Sheet 1

INVENTORS
Robert L. Needham
BY James B. Upham

Their Attorney

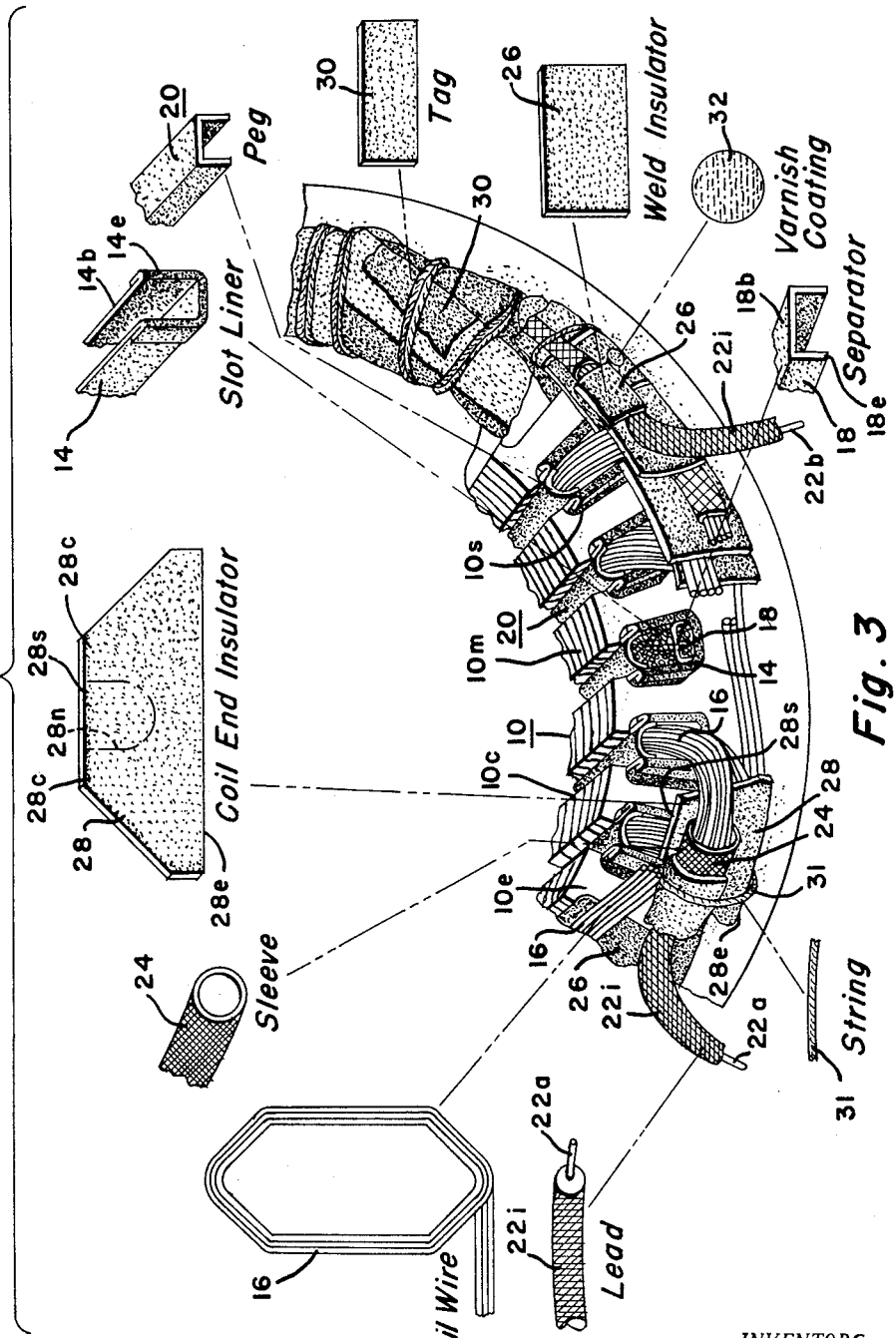

United States Patent Office 3,038,093
Patented June 5, 1962

3,038,093
DYNAMOELECTRIC MACHINE INSULATION SYSTEM
Robert L. Needham and James B. Upham, Dayton, Ohio, assignors to General Motors Corporation, Detroit, Mich., a corporation of Delaware
Filed Feb. 3, 1960, Ser. No. 6,445
6 Claims. (Cl. 310—179)

This invention relates to dynamoelectric machines and particularly to insulation of components thereof.

An object of this invention is to provide a new and improved insulating system for dynamoelectric machines.

Another object of this invention is to provide a dynamoelectric machine having components provided with all-acrylic insulation that is free of cellulose material and/or components and mixtures of different types of resins which are incompatible with each other under varying environments to promote conditions that might deleteriously affect the insulating qualities of one or more of the materials.

Another object of this invention is to provide a dynamoelectric machine having a member formed of a stack of slotted metal laminations aligned relative to each other and including insulating materials forming slot liners, separators in between coils used in slots, coverings for coil wire, casings for lead wires connected to coil wire, pegs for holding coil wires in slots, sleeves to cover junctures of coil wire and leads, and coil end insulators adapted to be fitted in between various coils all impregnated and/or coated basically with the same polymeric insulating materials.

A further object of this invention is to provide a dynamoelectric machine having a stator including metal laminations having slots aligned relative to each other and including insulating materials impregnated and/or coated only with acrylic polymer resin compositions compatible with each other.

Another object of this invention is to provide a dynamoelectric machine having a stator assembly including metal laminations having slots aligned relative to each other and including insulating materials forming slot liners, separators in between coils used in slots, coverings for coil wire, casings for lead wires connected to coil wire, pegs for holding coil wires in slots, sleeves to cover junctions of coil wire and leads, coil end insulators adapted to be fitted in between various coils, tape-like wrapping for sleeves where needed, tags (optional) of fabric used to identify electrical ratings of the machine, string covering for tying coil wire and/or leads, and a dipping (optional) of varnish for a completed stator assembly all using mixtures in varying proportions of acrylic polymer and interpolymer derivatives thereof.

A further object of this invention is to provide a dynamoelectric machine having a member formed of a stack of slotted metal laminations aligned relative to each other and including insulating materials having a composition, the major proportion of the resin ingredient being a polymer of acrylonitrile. It is to be understood that the terms "acrylic," "all-acrylic," "acrylate resin" and acrylic polymers and interpolymers as used herein all refer to materials including polymerized acrylonitrile as a main component either alone or in combination with other materials.

Further objects and advantages of the present invention will be apparent from the following description reference being had to the accompanying drawings wherein a preferred embodiment of the present invention is clearly shown.

In the drawings:

FIGURE 3 is a diagram including a fragmentary perspective view of a member of the dynamoelectric machine of FIGURE 1 and of insulating means thereon in accordance with the present invention represented diagrammatically as an insulating system and including components shown in magnified views individually.

Figure 1:
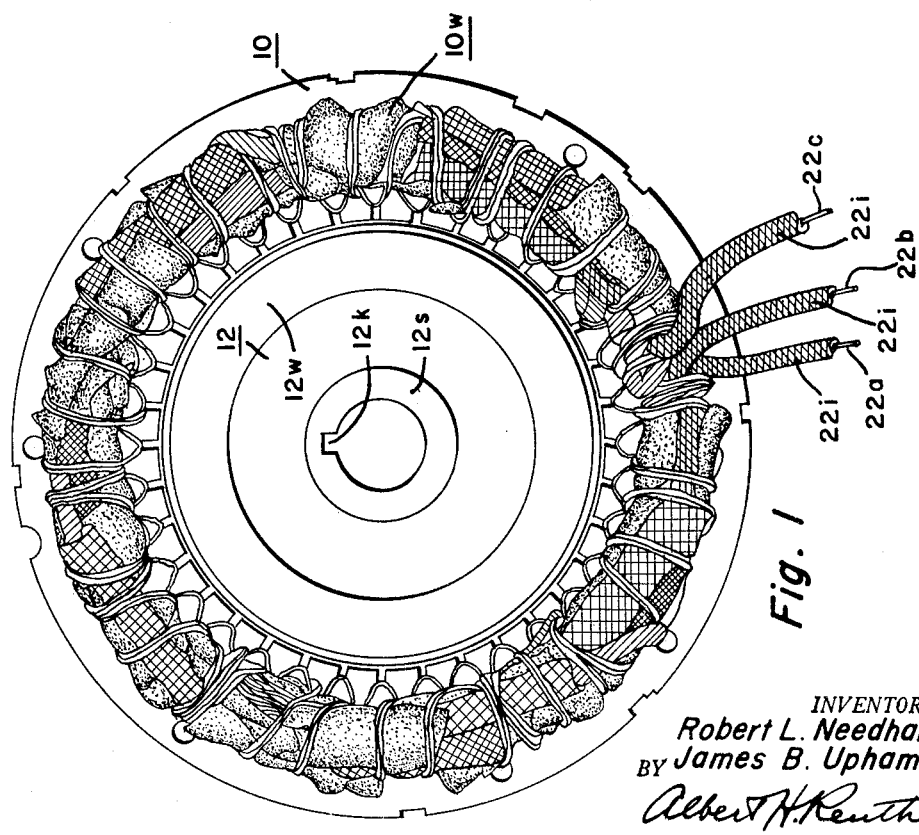
FIGURE 1 is an end view of a dynamoelectric machine in accordance with the present invention.

The view of FIGURE 1 illustrates a dynamoelectric machine having a stator assembly generally indicated by numeral 10 and a rotor generally indicated by numeral 12. Both the stator and rotor are formed by stacks of laminations having slots aligned axially relative to each other in a well-known manner. Both the stator and rotor assemblies include electrical windings and conductors necessary to obtain operation of the dynamoelectric machine as is well-known in the art.

Figure 2:
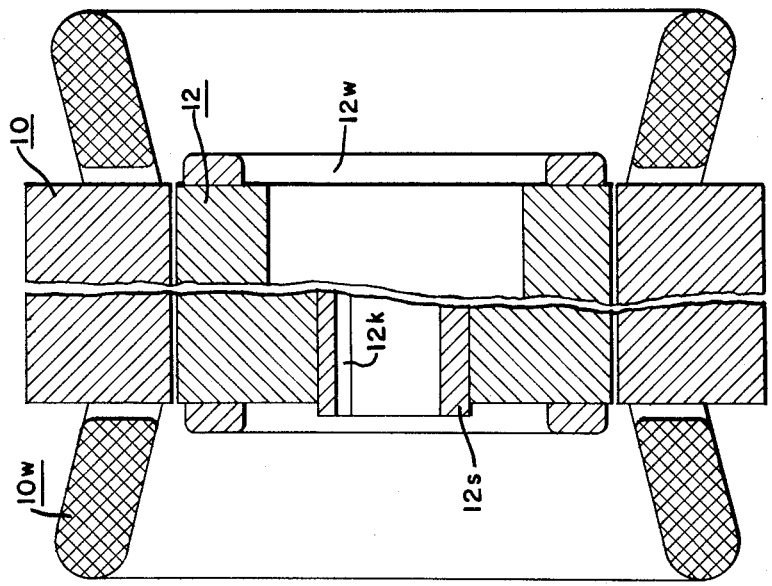
FIGURE 2 is a partially-sectioned side view of the machine of FIGURE 1.

In particular, the rotor includes a cast metal squirrel cage winding 12w including portions extending longitudinally through the axial slots and including end rings on each of opposite sides of the stack of laminations. The laminations are preferably press-fitted or otherwise secured to an outer periphery of a sleeve 12s provided with a key-way 12k for locking the rotor to a shaft not shown in the views of FIGURES 1 and 2.

The stator assembly 10 includes a plurality of coils or windings generally indicated by numeral 10w which are insulated relative to each other and relative to the stacked laminations of the stator assembly 10 in accordance with the present invention. A general outline of components of an insulating system used relative to the windings and stator in accordance with the present invention is visible in the end view of FIGURE 1 and can be better understood by referring to the diagram of FIGURE 3. As shown in FIGURE 3 in a fragment of the stator assembly 10, there are multiple metal laminations 10m each having radially inwardly extending slots 10s aligned relative to each other so as to form a longitudinally or axially extending channel 10c relative to which windings and components of an insulating system in accordance with the present invention are placed. The following description sets forth components and insulating materials thereof used in accordance with the present invention. The components noted particularly are as follows:

(1) *Slot Liners*

One of the insulating means components provided for the stator assembly in accordance with the system of the present invention is a slot lining means or slot liner indicated by numeral 14 in FIGURE 3. The slot liner 14 as shown in FIGURE 3 is visible in an installed position relative to the channels 10c and also in a perspective view provided to facilitate understanding of the present invention. Each of the insulating components for the stator assembly in accordance with the present invention is illustrated both in an installed position and in perspective views which are referenced by use of lines to indicate collectively a graphical representation of a common insulating material identified by the caption wording "all-acrylic insulation system for dynamoelectric machine—all compatible with acrylate resins." The slot liner 14 includes a longitudinally extending body portion 14b and an end portion 14e preferably provided in a substantially U-shape with curled-back ends as illustrated made of a single-ply fiberglass material impregnated with a fully cured acrylic polymer varnish or resin insulating material. The stator assembly in accordance with the present invention is preferably used on hermetic motors such as for refrigerating systems wherein refrigerants such as Freon are used. It is to be understood that the insulating system for the stator lamiantion assembly in accordance with the present invention can also be used for transformers, for generators, or for other dynamoelectric machine parts adapted to be used where atmospheric conditions will include fumes of any medium that can result in damage or proved deleterious to insulating material components. The insulating system for a stator assembly in accordance with the present invention is completely free of any cellulose material or papers which have been previously used to form individual components of an insulated dynamoelectric machine stator assembly. The fiberglass cloth used for making the slot liner preferably consists of a continuous filament electrical grade fiberglass base cloth variable in final thickness of an impregnated sheet and formed of a plain weave having a nominal thickness of impregnated cloth ranging between .003 to .014 inch and having a weight between 1.25 oz. to 6.00 oz. per square yard, for fiberglass cloth thickness per se between .002 and .007 inch. As to the physical properties of the fiberglass cloth insulating material used for the slot liners, it is preferred to provide a coating weight of 1.6 to 7.5 oz. per square yard. The tensile strength of material used for the slot liners varies between 50 and 250 pounds per square inch, and dielectric strength is preferably between 350 and 700 volts per mil minimum average using ¼ inch electrodes. The thickness of coated resin material is as follows:

| Nominal | Minimum | Maximum |
| --- | --- | --- |
| .003 | .0025 | .0035 |
| .005 | .0045 | .0055 |
| .010 | .009 | .011 |
| .014 | .013 | .016 |

Any composition of material as disclosed in a Du Pont Patent 2,787,561, Sanders, issued April 2, 1957, would be satisfactory as a coating and/or impregnating composition for the glass cloth used to insulate the slots of the stator lamination assembly in accordance with the present invention. The resins used as a coating and/or impregnating material for the insulating means of the dynamoelectric machine are commercially known as acrylate resins having ingredients including acrylonitrile which is polymerizable. Preferably a material comprising monomeric polymerizable components is used to form interpolymers having ingredients within the following operative ranges. Acrylonitrile is provided in a range of between 40 and 75 parts by weight; alpha-olefinic monocarboxylic acid is provided between two to 16 parts by weight; alkyl acrylate is provided between 15 to 37.5 parts by weight and polymerizable glycidal derivative is provided between 1 to 25 parts by weight for a total of 100 parts of a mixture.

A specific example of a useful acrylate resin hereinafter referred to as Example 1 is as follows with all parts expressed on a weight basis: Polymerizable monomers including 63 parts by weight of acrylonitrile, 27 parts by weight of butyl acrylate, 5 parts by weight of methacrylic acid, and 5 parts by weight of glycidyl methacrylate. Also included in the mixture of the interpolymer is a polymerization initiator including 0.1 part by weight of sodium bisulfite and 0.3 part by weight of potassium persulfate. To this mixture is added a dispersing agent such as sodium "Lorol" sulfate in a quantity of 0.5 part by weight together with water in a quantity of 200 parts by weight. Preferably the interpolymer of Example 1 is used together with the following materials to form a composition in which there is an aqueous dispersion of the interpolymer just described having 35.8% solids and added to be 77.3 parts by weight of the total mixtures. 4.5 parts by weight of this final mixture is an aqueous dispersion of heat reactive phenol formaldehyde resin having 33% solids. Also included is 8.3 parts by weight tetramethylene sulfone. There must be also 1.6 parts by weight aqueous ammonium hydroxide (28% NH$_3$) (to pH value of 9.5) and a remainder of water comprising 8.3 parts by weight for this particular sample. It is to be understood that the water dilutable phenol/formaldehyde resin is commercially available as Bakelite having 66% solids in an aqueous medium. It is also to be understood that compositions of the acrylate resins can be modified by addition of pigments, fillers, dyes, plasticizers and other resinous film formers compatible with interpolymer compositions of polymerizable monomers. For purposes of later reference, it is to be noted that the interpolymer composition of Example 1 for insulating components of the dynamoelectric machine having the insulating system in accordance with the present invention can be used with similar success with the same as well as a varied or a similar mixture or composition of material.

(2) *Coil Wire*

The next component of the dynamoelectric machine is an electrically insulated winding made of coil wire identified by numeral 16 in FIGURE 3. It is to be understood that multiple coils are placed into the slots provided with slot liners 14 in a well-known manner. There is contact between the coil wire and an inner periphery of the body portion 14b of the slot liner 14 treated with the acrylate resin material and therefore in accordance with the present invention, it is desirable to have the coil wire insulated with a composition or mixture compatible with the composition or mixture used for treating the slot liner 14. The metal conductor of the coil wire is preferably a round annealed copper or aluminum wire insulated with a baked film of acrylic resin for use in hermetic units and the like. The wire is coated with an even, continuous insulating film of acrylic resin applied from aqueous suspension. The film is specified to be non-hygroscopic, insoluble in mineral oils, glossy, hard and elastic so that it has no tendency to chip off or stick when bent or unwound from a spool. A mixture or composition for use in forming a coating or film on the wire and labeled Example B can be made of any wire enamels usable with varying degrees of success and particularly as disclosed in a Du Pont Patent 2,787,603, Sanders, issued April 2, 1957. A wire enamel or coating compatible with the Example 1 for the slot liner described above, includes an interpolymer composition prepared from the following polymerization charge. There is water in a quantity of 200 parts by weight together with sodium bisulfite in 0.1 part by weight and sodium "Lorol" sulfate in 0.5 part by weight and polymerizable monomers including acrylonitrile as 73 parts by weight, butyl acrylate as 22 parts by weight and methacrylic acid as 5.0 parts by weight. Also added to the interpolymer is potassium persulfate as 0.3 part by weight all taken as an aqueous dispersion of the interpolymer mixture (36.3%)—solids—to formulate 77.3% by weight of the interpolymer mixture to which ingredients are added as follows:

There is added an aqueous dispersion of heat reactive phenol formaldehyde resin (33% solids) in a quantity 4.5% by weight and also aqueous ammonium hydroxide (28% NH$_3$) (to pH value of about 9.0) as 1.3% by weight as well as 50% aqueous solution of cyclic ethylene carbonate as 16.9% by weight. This is Example III of Du Pont Patent 2,787,603. Also workable as a wire enamel is the composition or mixture of Example IV of Patent 2,787,603.

It is further noted that in the Du Pont Patent 2,787,603 there is an Example V relating to a wire enamel composition used to give two dip coats of acrylic resin to a woven glass fabric which would be usable as the insulating material for the slot liners described above. This Example V would be satisfactory for use as the acrylic resin coating and would be compatible just as each of the examples one through twelve of Patent 2,787,561 would be.

(3) *Separator*

Also shown in FIGURE 3 is a separator or insulating means 18 adapted to be inserted to cover a bottom portion of coil wire 16 placed adjacent to a lower periphery or into a lower space adjacent to an inner periphery of the slot liner 14. The separator 18 has a longitudinally extending body portion provided with edges 18e extending in contiguous relationship to a body portion 18b of the separator. The edges 18e are adapted to be wedged or fitted against an inner peripheral surface of the slot liner surface so as to form a partition between coil wire in the bottom of slots 10s and additional coil wire placed on top of the separator 18. The acyrlic resin composition used to treat a fiberglass cloth of single-ply is preferably equivalet to that used for treating the fiberglass of the slot liner. The Example 1 given for the slot liner as described above is applicable for the separator also. However, as a matter of distinction, it should be noted that the acrylic polymer varnish or composition coated to the glass cloth for separators is semi-cured and must be heated at a temperature such as 280 degrees F. for not less than one hour or dipped in the acrylic polymer varnish and baked for a minimum of three hours at 280 degrees F. Again any of twelve examples of acrylic resin materials set forth in Patent 2,787,561 can be taken as a working example and stiffness of the glass cloth is variable in accordance with the quantity of phenol formaldehyde added to the composition of the coating material. The number of coating dips provided for the glass cloth will contribute to the variation of dielectric strength and thickness obtained by treating the glass cloth as described.

(4) *Peg or Slot Closure*

Even the slot closing means or peg generally indicated by numeral 20 in FIGURE 3 is made of a fiberglass cloth impregnated with an acrylic polymer varnish or resin material. However, the peg differs specifically from the slot liner and separator described above in that instead of one ply of fiberglass cloth, there is provided a two-ply laminate of the fiberglass insulating material impregnated with acrylic polymer varnish or insulating material. The composition of the acrylic resin polymeric material for the pegs or slot closing means is the same as provided for the slot liner and/or the separator described above. It should be noted that the variations in the ingredients of the compositions can be made to provide stiffness and dielectric strength necessary in accordance with the electrical and physical characteristics of the coil wire and slots of a particular dynamoelectric machine stator assembly.

(5) *Leads*

As is well-known in the art of dynamoelectric machines, electrical connections must be made with coil wire at certain tap-off points to permit energization of the coil wire for operation of the dynamoelectric machine. As indicated in the view of FIGURE 1 of the drawings, there are leads 22a, 22b, and 22c which are brought out of the stator coil assembly and which are adapted to be connected to any suitable source of power for the stator windings. The leads include a metal conductor such as copper wire covered with an acylic polymer spun yarn such as six-braid Orlon. According to the Merck Index, 6th edition of Chemicals and Drugs, 1952, Orlon, which is a trade name, designates a polymer of acrylonitrile which is available as an ivory-colored plastic solid available in the form of continuous filament yarn. Orlon does not have quite the strength or abrasive resistance of nylon, but according to the Merck Index, it is warmer and feels more like silk. Orlon has excellent resistance to heat and acids and is practically impervious to weather, sea spray, sunlight, mildew, moths, and most chemical fumes. In accordance with the present invention, a weld or other suitable electrical connection such as by soldering is provided between the coil wire and conductor of the leads. Since Orlon of the lead insulation is a polymer of acrylonitrile, there is further compatibility of the insulating components described thus far. Preferably the braid on the leads contains no dye or sizing. A tracer thread which is dyed with a colorfast dye can be provided in the leads. As a specific example of a composition of acrylic polymer material for insulating material 22i of the leads, reference is made to the specific example listed above for insulating material or coating acrylic resin used with the coil wire as described above. Suitable metal terminals, not shown, are provided at free ends of the leads in a well-known manner.

(6) *Sleeves*

At the electrical connection between leads and coil wires where soldering, welding or twisting of the wires can be used to establish such a connection, it is necessary to provide separate insulating means to prevent shorting between coil and lead connections at various places relative to the windings. Therefore, a tubular means or sleeve 24 is provided and is made of glass cloth impregnated and/or coated with an acrylate resin material such as that described for the slot liner above. The sleeve is fitted longitudinally over the leads and forms a cylindrical housing for protecting the juncture or electrical connection between the leads and coil wire. Since the example compositions for the slot liner coil wire, leads and sleeves are identical basically, there is further compatibility so far as the insulating materials are concerned. The insulating materials for both the sleeves and the sheets of glass cloth is such that preferably phenol formaldehyde is included as an ingredient for added stiffness and dielectric strength of the insulating materials.

(7) *Weld Insulator*

After providing the juncture of the coil wire and leads with a sleeve 24, it is advisable to wrap a band or tape 26 of acrylic polymer impregnated glass cloth around opposite ends of the sleeves relative to the acrylic polymer insulating material of the leads and of the coil wires. The rapping of the tape or band around the sleeve assures sealing of opposite ends of the sleeves relative to the insulation of leads and/or coil wires. The weld insulator or tape includes insulating material having ingradients of which an example is given with the description of the slot liner above.

(8) *Coil End Insulator*

Further insulating means in accordance with the system of the present invention is provided by having single-ply sheets of glass fiber cloth impregnated with acrylate resin material. These sheets can be referred to as coil end insulators 28 shown in FIGURE 3. The coil end insulators are trapezoidal in shape and can vary in length and width according to the geometry and phyisical dimensions of coils formed using coil wire 16 having the acrylic resin coating or insulating material thereon. Short side 28s of the trapezoidal shape of the coil end insulators 28 is placed adjacent to one end 10e of the stator lamination assembly and an extended side 28e is placed remote from the end of the stator lamination assembly. The coil end insulator is fitted in between coils of various phases of the windings of the stator 10 and each of the coil end insulators serves to separate coil wire as necessary. The sleeves 24 as well as the weld insulators 26 and acrylic resin material coating on the coil wires 16 are in contact with the coil end insulators. Thus the coil end insulators as part of the insulating system in accordance with the present invention are also impregnated and/or coated with an acrylic resin material including ingredients formed into a composition in accordance with the Example 1 or the like given for the slot liner described above. The coil end insulators can be stiffened by addition of phenol formaldehyde in varying proportions as necessary.

(9) Tag

As an optional feature, the dynamoelectric machine in accordance with the present invention is provided with a square piece of glass cloth impregnated with acrylic resin material to form a tag 30 shown as part of FIGURE 3 and identified further in FIGURE 1. This tag is provided with an insulating material in accordance with the Example 1 or the like given for the slot liners described above and the tag is placed directly onto the coil ends and coil end insulators adjacent to one side of the stator lamination assembly 10. The tags provide information as to the electrical characteristics and ratings of the particular stator lamination assembly.

(10) String

As part of the final assembly of the windings relative to a stack of stator laminations, it is necessary to tie ends of the coils and insulation thereof into a bundle in a well-known manner. Even the string indicated by numeral 31 is made of an insulating material preferably Orlon having the composition as described for the leads above. This string or cord comprises spun yarn fiber acrylic polymer ("Lecton") bonded acrylic polymer ("Orlon") cord to be used in the electrical insulating system of the present invention.

(11) Varnish

The stator lamination assembly provided with compatible acrylic insulating materials for all ten components described above can be left without a final dipping into varnish or can be finished with a dip into the varnish to provide a coating 32, a fragment of which is indicated diagrammatically in FIGURE 3. The varnish coating 32 is exemplified by a sample composition as follows:

An interpolymer mixture is prepared for emulsion polymerization with a polymerization charge including 200 parts by weight of water, 0.1 part by weight of sodium bisulfite, 0.5 part by weight of sodium "Lorol" sulfate and polymerizable monomers comprising acrylonitrile as 63.0 parts by weight, butyl acrylate as 32.0 parts by weight as well as methacrylic acid as 5.0 parts by weight and also potassium persulfate having 0.3 part by weight. This interpolymer composition is formed into a coating by providing an aqueous dispersion of the polymer having 81.4% by weight to which there is added in the aqueous dispersion a heat reactive phenol/formaldehyde resin (33% solids) as 4.6% by weight and also aqueous ammonium hydroxide (28% $NH_3$) (to pH value of about 9.4%) as 1.8% by weight and a remainder of water having 12.2% by weight. Addition of phenol formaldehyde in greater quantities to the varnish or final dip coating is provided to increase rigidity of the material and to increase the insulating characteristics, particularly the temperature at which a cut through or break through in resistance can occur. For the example of the acrylate coating or varnish just given, a cut through temperature of approximately 420 degrees F. is obtained. The varnish incorporates an acrylic resin so formulated and modified that it can be thinned with distilled or demineralized water to meet liquid requirements for the dipping step. The varnish is such that is necessarily stable at room temperature.

The insulating system using all-acrylic resin insulating materials is particularly useful for stator lamination assemblies adapted to be provided for hermetic motor applications. The insulating system of the present invention is distinguishable and differs completely from previously known motor installations using only a combination of various mixtures such as combinations of polyester and acrylic resins. When combination non-acrylic and acrylic insulation materials are used, there is a chance for reaction of the differing insulating materials under certain atmospheric conditions such as can occur when fumes of a refrigerant such as Freon are present in atmosphere surrounding a hermetic motor.

Though the drawings illustrating the present invention show a squirrel cage rotor with a round rotor, it is to be understood that a wound rotor could also be used in conjunction with an insulating system in accordance with the present invention. All of the parts and components of the insulating system in accordance with the present invention must be impregnated and/or coated with the same polymeric insulating material and all insulating material must be compatible with acrylate resin compositions.

It is to be understood that in place of fiberglass cloth material noted, for example, for insulators 26 and 28 and the like, it is possible to provide paper-like sheet material having Orlon fiber therein permeated or surrounded by acrylic or "Lecton" polymer or varnish used in accordance with the all-acrylic insulating system for dynamoelectric machines of the present invention. Thus, acrylic carried by permeable insulating means such as paper-like cloth, or fiberglass material is used for insulating purposes and to eliminate films or coatings which are not as stable under deleterious moisture and temperature conditions. Acrylic varnishes, for example, are water emulsions of acrylonitrile resin which, when cured, provide relatively high resistance to liquid and gaseous refrigerants including Freon. It is also to be noted that for lead insulation 22i, it is also possible to use at least two braids of Orlon (acrylonitrile) with an outer braid that is coated with Teflon or polytetrafluoroethylene. The lead insulation when made of Orlon alone is often too fuzzy. Also the lead insulation 22i can be woven using glass fiber coated with acrylic resin as well as Teflon and the like to be comptable for use in the all-acrylic dynamoelectric machine insulating system in accordance with the present invention. Proportions of acrylate used can vary though straight acrylate without phenolic is preferred for roving purposes. The string 21 can be Lecton (acrylic) impregnated glass fibers used as tie cord. Acrylic impregnated viscose rayon tie cord is stronger and less expensive than cotton cord so impregnated. For added stiffness, phenolic is added to acrylic resin composition of sleeve 24, varnish 32, and sleeve 24. There is a preponderance of acrylic insulation throughout. It is also possible to combine polycarbonate (Lexon) as well as acetal (Delrin) resins with acrylic resins relative to pieces such as the slot liner 14, coil wire 16, sleeve 24, and coil end insulator 28. The short edge 28e of the coil end insulating can be provided with a U-shaped cut-out portion or notch 28n between a pair of corners 28c to facilitate hooking thereof under an end turn of coil wire 16. Such hooking under the end turn avoids displacement or shifting of insulator 28 during winding of the stator. A U-shaped cut-out 28n is shown in phantom in FIGURE 3. When automatic stator winding machines are used, it is necessary to avoid tearing of insulating sheet material. For this purpose a mixture including substantially 66% of acrylonitrile by weight is preferred. Further examples of suitable polymer preparations are the following materials. An emulsion of n-hexyl acrylate can be used having 64.9% by weight of acrylonitrile (84.5% mole) involving substantially 30 grams acrylate and 70 grams acrylonitrile with about 0.1 gram potassium persulfate as catalyst. With the same weight of catalyst and sufficient water such as 400 ml. cyclohexyl 2-ethylbutyl acrylate having either 63% by weight (83.4% mole) acrylonitrile, 65 grams acrylate, 35 grams acrylonitrile or 66.4% by weight (85.3% mole) acrylonitrile, 70 grams acrylate and 30 grams acrylonitrile can be used. A suspension of stearyl methacrylate having 62.3% by weight (91.4% mole) acrylonitrile, substantially 30 grams acrylate, substantially 70 grams acrylonitrile and 0.8 gram catalyst such as benzoyl peroxide is also available in this range of proportions. In all instances, a slightly brittle or brittle mechanical property is realized with high resistivity and stable power factor. Impedance in ohms ranges around $4 \times 10^5$. Increasing nitrile content causes 60-cycle loss factor to increase together with dielectric constant rise, more hardness and less flexibility. Tensile strength is such that insulation breakage of slot liners for example is far less than occurs with rag paper instead of acrylic materials. Resistance to moisture absorption and deterioration is greatly increased. It is to be understood that varying mixtures of acrylic can be supplemented with a wide range of organic or inorganic pigments or filling agents. A Du Pont Patent 2,866,763, Sanders, issued December 30, 1958, relates generally to a process for preparing aqueous dispersion of an acrylonitrile interpolymer and thermosetting resin. Any materials as available in accordance with the noted Du Pont patents are believed to be satisfactory for use in insulation of dynamoelectric machine components and even transformer coils as well as stators of motors of generators having squirrel cage or wound rotors using an all-acrylic insulation system in accordance with the present invention.

While the embodiments of the present invention as herein disclosed constitute preferred forms, it is to be understood that other forms might be adopted.

What is claimed is as follows:

1. In a dynamoelectric machine having a stator assembly including a plurality of slotted metal laminations aligned relative to each other so as to form channels, an all-acrylic insulating system including a plurality of components, comprising acrylic-insulated slot liner means including a longitudinally extending body portion as well doubled-over end portions located adjacent to an end lamination, acrylic-insulated coil wire means placed adjacent to and inside said acrylic-insulated liner means as well as including end turn portions extending beyond the slots to a location free of the end lamination, acrylic-insulated peg means longitudinal in shape for holding said acrylic-insulated coil wire means inside the slots in engagement with said acrylic-insulated liner means, lead wire means having an acrylic-fiber braid as insulation thereon and attached to ends of said acrylic-insulated coil wire means, acrylic-insulated sleeve means fitted over a juncture of said lead wire means having said acrylic-fiber braid and ends of said acrylic-insulated coil wire means, acrylic-insulated coil end insulator pieces each substantially trapezoidal in shape with a truncated-cone-like edge shorter than another parallel longer edge, said shorter edge having a location closer to the end lamination such that a wider portion of the acrylic-insulated pieces is between end turns of said acrylic-insulated coil wire means, and string means binding said sleeve means and coil end insulator pieces together into all-acrylic compatible bundling.

2. The insulating system of claim 1 wherein said shorter edge of said acrylic-insulated coil end insulator pieces has a U-shaped notch therein located in between corner portions which are adapted to be hooked under end turns of said acrylic-insulated coil wire means, said corner portions and notch forming a shape to straddle the end turn and thereby preventing displacement as well as shifting thereof during assembly of the components relative to the insulating system.

3. The insulating system of claim 1 wherein said coil end insulator pieces have a paper-like structure that is acrylic-insulated to be fully compatible with acrylate resin material.

4. The insulating system of claim 1 wherein said acrylic-fiber braid of said insulation means is coated at least in part with polytetrafluoroethylene for minimizing fuzziness of said acrylic-fiber braid.

5. For use in an insulating system on a dynamoelectric machine having a stator assembly with slotted laminations aligned relative to each other and fitted with wire coil means having end turns extending beyond an end lamination, a coil end insulator means, comprising, a body portion substantially trapezoidal in shape including a truncated-cone-like edge portion shorter than another substantially parallel longer edge portion, said shorter edge having a cutout therein located intermediate a pair of corners adapted to straddle the end turn such that said shorter edge is located closer to the end lamination leaving the longer edge and said body portion mainly as insulation for said end turn of said wire coil means, said corners hooking into engagement with said coil means so as to avoid displacement thereof as well as shifting thereof relative to the end lamination.

6. On a dynamoelectric machine having a plurality of slotted metal laminations aligned relative to each other, an all-acrylic insulating system free of cellulose material as well as combinations and mixtures of different types of resins which are incompatible with each other under varying atmospheric conditions such as would include gaseous fumes deleteriously affecting insulation of components, comprising, slot liner means including a longitudinally extending body part of glass cloth impregnated with insulating material, a coil wire means having a covering part of insulating material, separator means adapted to be placed in between said coil wire means and having a body part of glass cloth impregnated with insulating material, lead wire means attached to ends of said coil wire means and having a casing part of insulating material, peg means for holding said coil wire means in slots and formed as a longitudinally extending body part of glass cloth impregnated with insulating material, wrapping means including glass cloth parts impregnated with insulating material for covering ends of said coil wire means, said parts all having in common said insulating materials having a composition the major proportion of which is a resin ingredient which is a polymer of acrylonitrile, said wrapping means including a trapezoidally-shaped coil end insulator piece having a fabric body portion coated, impregnated and the like with acrylic as well as phenolic, polycarbonate and acetal resin material and the like, sleeve means to cover a juncture of said ends of coil wire means and said lead wire means, said sleeve means having a substantially cylindrical body portion coated, impregnated and the like with acrylic as well as a hard-wear stiffening means such as phenolic, polycarbonate and acetal resin material and the like, and a final outer covering of acrylic material provided as overall coating, varnish and the like for components of said insulating system in which a major proportion of resin ingredient is a polymer of acrylonitrile.

References Cited in the file of this patent

UNITED STATES PATENTS

| | | |
|---|---|---|
| 2,252,240 | Safford | Aug. 12, 1941 |
| 2,747,118 | Coggeshall | May 22, 1956 |
| 2,787,561 | Sanders | Apr. 2, 1957 |
| 2,787,603 | Sanders | Apr. 2, 1957 |